Nov. 6, 1928.　　　　　　　　　　　　　　　　　　　1,690,375
J. E. MITCHELL ET AL
COTTON RECLEANING MACHINE
Filed Sept. 15, 1925　　　2 Sheets-Sheet 1
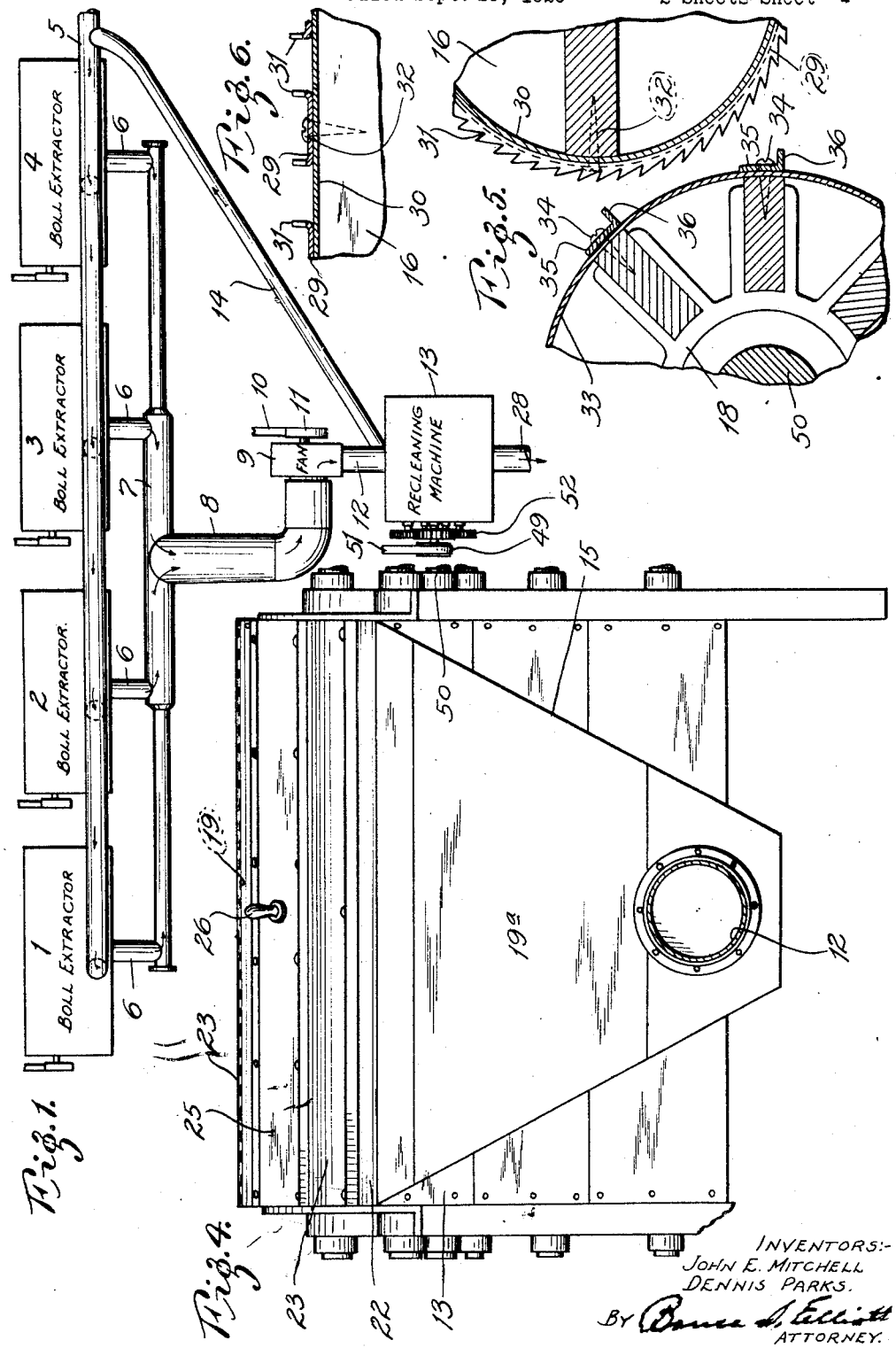
INVENTORS:-
JOHN E. MITCHELL
DENNIS PARKS.
ATTORNEY.

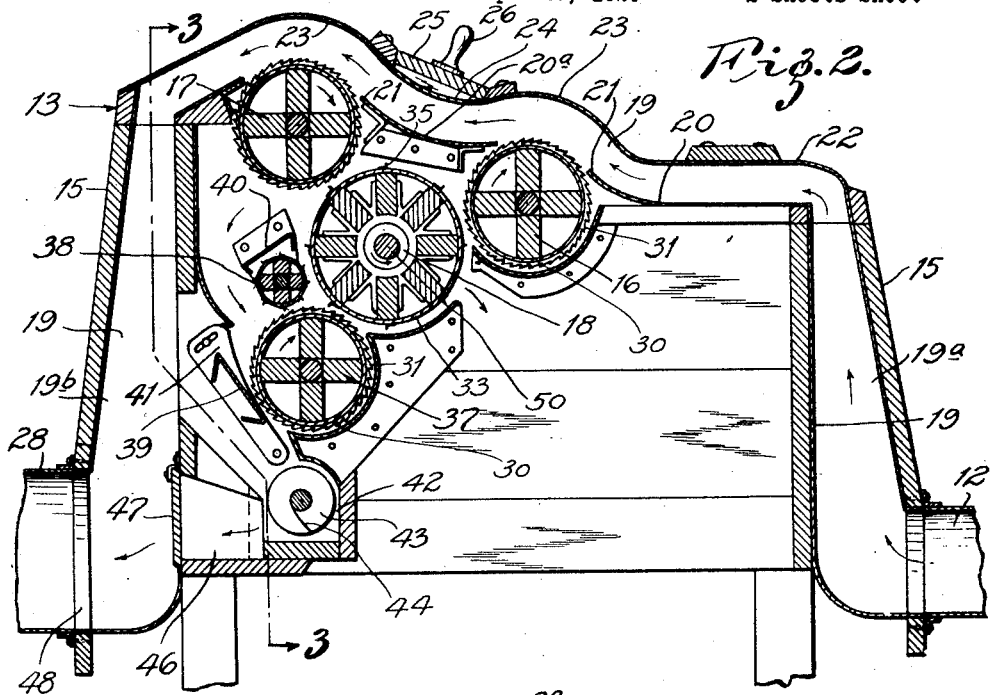
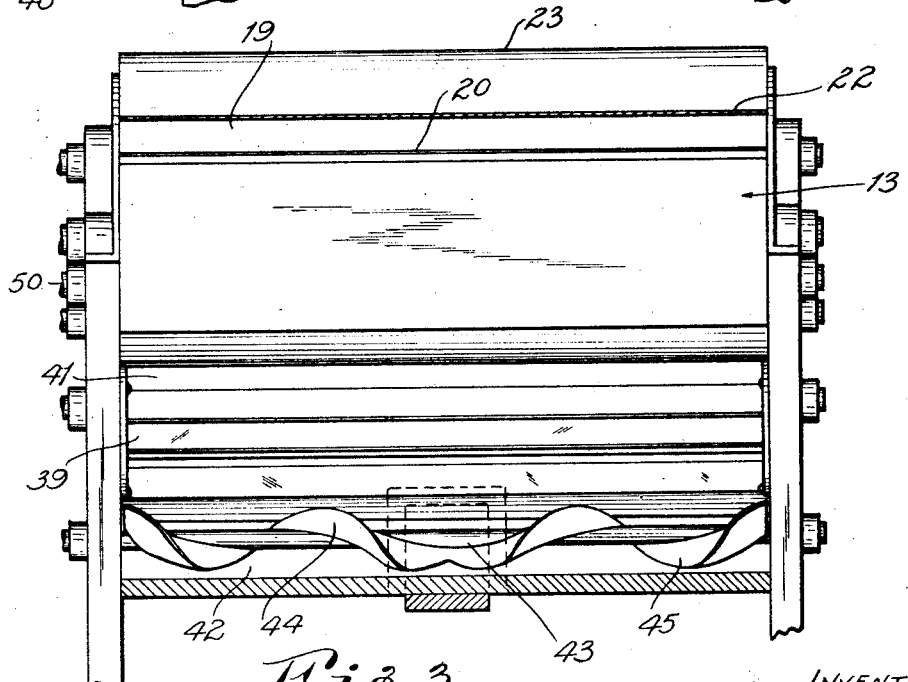

Patented Nov. 6, 1928.

1,690,375

UNITED STATES PATENT OFFICE.

JOHN E. MITCHELL AND DENNIS PARKS, OF ST. LOUIS, MISSOURI.

COTTON-RECLEANING MACHINE.

Application filed September 15, 1925. Serial No. 56,437.

This invention relates to novel apparatus for use in reclaiming cotton from the product discharged from a battery of cotton cleaning, or boll extracting, machines.

The cotton cleaning machine for which various patents have heretofore been granted to us, both individually and jointly, operates, in practice, to extract all but a very small percentage of the cotton, and the small percentage that escapes with the hulls is, for the most part, an inferior kind of cotton made up, usually, of hard one-seed locks. Formerly, it was considered desirable to get rid of most of this cotton, but it has been found that if the locks are suitably opened up so that the saws can engage the cotton, the latter can be easily reclaimed, and while not of the value of the best grade of cotton, it is, by no means, an inferior product and is well worth saving, especially in a large gin plant where the quantity of such cotton discharged with the hulls would be considerable in the course of a day's run.

In Patent No. 1,182,193, granted to us May 9th, 1916, there is described a method of recovering cotton from hulls discharged from a battery of machines. This method, briefly, consists in conveying the hulls from a plurality of machines into a single recleaning machine, for the purpose of taking out any cotton that may be in the hulls, and then continuously returning the reclaimed cotton back to the gin. This process, when applied to reclaiming cotton under present conditions has two pronounced disadvantages: First, it is entirely inadequate in capacity to cope with the large amount of hulls discharged from a battery of four, five, or six of our boll extractors. Since the advent of the cotton cleaning or boll extracting machine, and especially during the past four or five years, the cotton brought to the gin plants has been increasingly mixed with hulls, sticks, and other foreign matter, in addition to unopened bolls. This is probably due to the fact that pickers and others handling the cotton have learned that such trashy cotton can be easily handled with the use of cleaning machines, which are now generally employed on the gins, and hence they are not as careful as formerly to bring only relatively clean cotton to be ginned. The result is that any recleaning machine would now have several times the bulk of hulls and other foreign matter to contend with that it would have had under the conditions that prevailed a few years ago, or, say, at the time the said patent to Mitchell & Parks was granted. It is, therefore, necessary that any recleaning apparatus should be capable of getting rid of hulls, trash, and other foreign matter with great speed. Second, in the recleaning method of the patent referred to, no preparatory treatment is given the small hard locks of cotton that escape with the hulls before they are brought into contact with the saw cylinder of the recleaning machine. This makes it very difficult for the saw cylinder of such machine to extract these hard locks, for the reason that they are likely to bounce off the teeth of the saw in the recleaning machine just as they bounce off the teeth of the saw in the main battery of machines.

The present invention has for its general object, therefore, to provide a recleaning machine which will be capable of permitting a large quantity of hulls and trash to pass through the same, and which at the same time, will offer sufficient means for obstructing the passage of cotton or locks of cotton, by causing the same to impinge upon the saw teeth of one or more saw cylinders, whereby the cotton will be withdrawn by the saws and recovered in the ordinary manner.

A further general object of the invention is to provide means which will operate, in passing the mixed cotton and hulls from the main battery of machines to the recleaning machine, to open or fluff up the hard locks of cotton, so that the saw teeth may readily engage the same when the locks come in contact with the saw cylinders.

A further object of the invention relates to the provision of recleaning mechanism associated with the doffer cylinder which removes the cotton from the saw cylinders, whereby said doffer will operate to doff the reclaimed cotton from the saw cylinders, to discharge the same into a recleaning system, and to remove or doff the cotton from the saw cylinder of the recleaning system and discharge it from the machine.

A final object of the invention relates to the provision of novel means for removing hulls from the recleaning part of the machine and causing them to join the main body of hulls propelled through the machine by air and substantially sealing the outlet for hulls from the recleaning system against entrance of air.

Other objects relate to various details of construction and to novel combinations and arrangements of parts whereby the broad objects of the invention are attained.

With the above general objects in view, the invention consists in the provision of apparatus in the operation of which the mixed cotton and hulls are continuously drawn by suction from the main battery of boll extractors or cleaners and passed through the fan casing of the fan producing the suction, and are discharged by this fan into contact with one or more saw cylinders, which take the cotton out of the mixture and allow the hulls to be discharged with the air. Each saw cylinder in the recleaning machine, if more than one is provided, is so positioned that it will rotate in the discharge trunk of the fan against the discharge. Therefore, all locks of cotton which are thrown by the fan or the blast of air against the saw cylinder stick fast onto the teeth of the same and are then carried around out of the air trunk into proximity to a rotating doffer, by which it is doffed off and discharged into a recleaning system, of which the doffer is also a part. The hulls, on the other hand, driven by the fan with great velocity against the teeth of the saw cylinder, bounce off of the same and pass out through the air trunk with the air.

The invention is illustrated in the accompanying drawing, in which—

Figure 1 is a plan view, more or less diagrammatic, illustrating in outline a battery of boll extractors, and the means for conveying the hulls, and cotton mixed therewith, discharged therefrom to a recleaning machine, and for returning the cotton recovered in the recleaning machine back to the boll extractors;

Figure 2 is a central, vertical, sectional view on an enlarged scale of the recleaning machine;

Figure 3 is a vertical sectional view of the same on the line 3—3 of Figure 2;

Figure 4 is a view in front elevation;

Figure 5 is a broken sectional view illustrating a part of one of the saw cylinders of the recleaning machine, and of the doffer cylinder co-operating therewith; and Figure 6 is a longitudinal sectional view of a portion of the saw cylinder to show the arrangement of the saws thereon.

Referring now to the drawings, the numerals 1, 2, 3, and 4 indicate four boll extractors or cotton cleaning machines, which are supplied with the cotton to be cleaned through a feed pipe 5. Leading from the hull discharge of each of the boll extractors is a length of pipe 6, the pipes 6 communicating with a common discharge pipe 7, centrally of which is located a pipe 8, which communicates with the suction side of a fan casing 9, in which is located a fan (not shown), which is driven by a belt 10 and pulley 11. Extending from the outlet of the fan casing 9 is a pipe 12 which communicates with one end of a recleaning machine 13, to be later described. From the recleaning machine, a pipe 14 leads to a suitable place of deposit for the recleaned cotton.

Referring now to Figures 2 and 4, the recleaning machine comprises a casing 15 within which is located two saw cylinders 16 and 17 and a doffer cylinder 18, common to the two saw cylinders. I provide at the top of the casing 15 a passage through which the mixed hulls and cotton from the pipe 12 are blown or discharged by the fan in the casing 9, and in such manner as to come into contact with the saw cylinders 16 and 17.

This passage or air trunk is in the form of a sheet metal conduit 19 which, at its outer ends, depends downwardly, as indicated at 19$^a$ and 19$^b$, respectively. The leg or extension 19$^a$ communicates at its lower end with the discharge pipe 12 from the fan casing 9, and from this point to the line of connection with the part 19, is flared outwardly to the width of the casing 15 and of said part 19$^a$ of the conduit, which is substantially also the width of the saw cylinder 16. The saws 16 and 17 work through openings provided in the bottom 20 of the conduit 19, and the edge portions of said bottom 20 adjacent to said saw cylinders are upwardly curved and positioned in close proximity to the surface of said saw cylinders, as indicated at 21. The top 22 of conduit 19 is substantially parallel with the bottom throughout its length, and is upwardly curved above the saw cylinders 16 and 17 to provide sections substantially concentric therewith, as indicated by the numeral 23, and intermediate the curved sections 23, is reversely, or downwardly, curved, as indicated at 24. It is convenient to form the part 24 as a removable section mounted on a suitable base 25 having a handle 26 to facilitate the removal of the section. This is done in case the conduit 19 should become choked, or when, for any reason, access to the saws 16 and 17 is desirable.

Between the saw cylinders 16 and 17, the bottom of the conduit 19 is formed by a sheet metal section 20$^a$, which extends substantially parallel with the removable section 24 of the top, and has its ends located in close proximity to the surfaces of the saw cylinders, its end adjacent to the saw cylinder 17 affording the upwardly curved portion 21, previously referred to. The bottom section 20$^a$ is located directly over the doffer cylinder 18. Beyond the saw cylinder 17, the conduit 19 extends downwardly and communicates with the upper end of the depending leg or extension 19$^b$ of said conduit at the upper end of the latter.

From this point, the leg or extension 19ᵇ is gradually narrowed, and at its lower end, is provided with an outlet opening, in which is secured one end of a pipe 28 which leads to the dump.

The shape or disposition of the conduit 19 is an important feature of the invention, more particularly as respects the configuration of the upper wall thereof and the flared portions 19ª and 19ᵇ. If the upper wall were straight, it would have to be positioned close enough to the saws to make all of the cotton locks impinge upon the saw teeth, and this would result in preventing the free discharge of the hulls. On the other hand, if such a wall were located far enough away from the saw cylinders to permit the free discharge of the hulls, it would also permit a large proportion of the cotton to go through without coming in contact with the teeth of the saws. To insure the contact of the cotton with the saw cylinders while permitting the free passage through the conduit of the hulls, it becomes necessary to provide for a change in direction of the path of the material at the point where it impinges upon the saw cylinders, so that while the material is forced by the shape of the conduit into direct contact with the saw cylinders, permitting the cotton to be engaged thereby, the hulls may simply bounce off, or have their direction of movement slightly changed, without materially impeding the movement thereof. By an inspection of Figure 2, it will be seen that the upper wall of the conduit at the right of the first saw cylinder, if continued, would cut through the periphery of such cylinder; and that the upper wall of the conduit immediately beyond the first saw cylinder, say, at the beginning of the curved section 24, if continued, would cut through the periphery of the second saw cylinder. Thus, the upper wall of the conduit 19 provides two portions extending tangentially to the respective saw cylinders, while opposite the working face of each saw cylinder, this wall is formed substantially concentric with the surface thereof, providing ample space for the passage past the saw cylinders of the hulls. In effect, therefore, the portions of the conduit tangential to the saw cylinders act as deflectors to direct the material against the saw cylinders. The flare in the depending extension 19ª of the conduit or air trunk 19 between the fan and the first saw cylinder is essential in order to cause the product coming from the fan to spread out and be distributed evenly over the length of the saw cylinder.

It will be observed that the saw cylinders are so disposed in the air trunk 19 that less than one-half of the periphery of each saw cylinder extends through the wall of said air trunk. This feature, coupled with the upward curve of the bottom of the conduit adjacent each saw cylinder, insures that the material propelled through the conduit will have substantially tangential lines of contact with the saw cylinder, with the result that the hulls can engage and bounce off the saw cylinders without having their movement seriously impeded by the contact, and there is less tendency of the teeth of the saws to engage the hulls and grind them up or carry them out of the conduit.

The saw cylinders 16 and 17 may be of any preferred construction, but, as shown by Figures 5 and 6, they are preferably made by securing strips 29 at intervals around a cylinder 30, said strips having their edges upturned at right angles and provided with saw teeth 31, the strips being secured to the cylinder as by screws 32 passed through the strips and screwed into the body of the cylinder.

The doffer 18 may be conveniently formed by securing at suitable intervals lengthwise of a cylinder 33, as by means of screws 34, L-shaped strips 35, the foot 36 of each of which is adapted to travel in close proximity to the surface of the teeth 31 of the three saw cylinders.

The machine as thus far described will operate satisfactorily as a cotton reclaiming machine, so that the greater portion of the cotton mixed with the hulls treated by the machine will be recovered. A machine so constructed forms the basis of a method application filed of even date herewith.

Inasmuch, however, as with slight additions and at very little additional cost, we can also provide for a further recleaning of the cotton recovered by the machine, we find it desirable to embody such features with the elements of the cotton reclaiming machine above described.

With this object in view, we mount adjacent to the doffer 18 a recleaning saw cylinder 37 with which co-operates a kicker roller 38 and hull boards 39, in the way well known in cotton cleaning machines, and forming the subject matter of numerous prior patents granted to the present inventors, individually and jointly. The doffer cylinder 18 rotates in sufficiently close proximity to the surface of the recleaning saw cylinder 37 as to be capable of doffing the cotton from said saw cylinder. The recleaning members referred to are housed in the casing 15 on the underside of the conduit 19. With this arrangement, the cotton extracted by the saws 16 and 17 operating in the conduit 19 is doffed by the doffer cylinder 18, which operates to throw the recovered cotton with such hull particles as may adhere thereto over the kicker roller 38, where it slides down the hull boards 39 into engagement with the recleaning saw cylinder 37, which extracts the cotton, while the kicker roller prevents the hulls from passing along with the cotton, and the latter is removed from the saw cylinder by the doffer. The doffer cylinder 18 thus serves the triple function of doffing the cotton from the saw cylinder, or saw cylinders, in the air trunk, of throwing such cotton into the recleaning working chamber below the air trunk, and of doffing it again from the recleaning saw cylinder. A guard 40 is located over the kicker roller 38 to insure that the cotton and hulls from the doffer will be thrown over and fall upon the hull boards 39. A space 41 is provided between the lower end of the upper hull board and the upper end of the lower hull board to permit pieces of hulls to be thrown out by engagement with the saw cylinder 37.

A final important feature of the invention is the provision of means for discharging the hulls passing through the space between the lower hull board 39 and the saw cylinder 37, so that they will join the main body of hulls passing through the conduit 19. To this end, I provide below the end of the lower hull board a trough 42 in which I locate a duplex worm conveyor 43, the threads of the worm being wound oppositely from the ends of the conveyor to the center, as indicated by the numerals 44 and 45, (Figure 3), and opposite the center of this worm conveyor, I provide an outlet duct 46 opening into the downward extension 19$^b$ of the air trunk 19, and which is closed by a swinging trap door 47 which is located opposite a discharge opening 48 from the air trunk 19$^b$. The trap door 47 normally closes the duct 46, but as soon as the duct becomes full of the hulls, they press the door open and escape into the air trunk 19$^b$, and themselves provide a sufficient stoppage, in conjunction with the door 47, to prevent air passing through the conduit 19 and the extension 19$^b$ thereof from passing back through the duct 46 and up in the machine.

Any preferred means for driving the various rotating members of the machine may be employed, and in Figure 1, I have shown a pulley 49 mounted on one end of the shaft 50 (Figure 2) of the doffer cylinder 18, a belt 51 for driving said pulley, and a series of intermeshing gears 52 on the various shafts of the other rotating members driven from a gear on the shaft 50. Such driving mechanism being well known, it is not further illustrated in the enlarged views, and it only remains to be stated that the gears are so arranged as to produce rotation of the parts in the directions indicated by the arrows in Figure 2.

From the above description, it will be seen that the hulls, cotton locks and particles escaping from the boll extractors 1, 2, 3, and 4 will be drawn by suction through the pipe 8 into the fan casing 9 and thence be discharged at high velocity into the conduit 19, and that while the hulls can pass almost uninterruptedly through said conduit to the discharge pipe 28, the cotton locks and particles will be directed by the top portion 22 of said conduit directly into engagement with the surfaces of the saw cylinders 16 and 17 which move clockwise, or in a direction opposite to that of the hulls and cotton. The saw teeth 31 will readily engage any cotton or cotton locks which are caused to impinge upon them, and will carry the same beneath the edges 21 of the bottom 20 of the conduit, whence they will be disengaged from the teeth of the saws by the action of the doffer cylinder 18, which acts to throw the cotton into the recleaning system, whence the cotton will be doffed from the saw cylinder 37 and discharged through the pipe 14 by the doffer 18. From the pipe 14, the cotton may be either returned to the feed pipe 5 to be delivered to the boll extractors with the main body of cotton, or temporarily dumped on the floor of the gin, and subsequently and separately cleaned. Upon entering the fan casing 9, the hulls and cotton locks will, of course, be engaged by the blades of the rapidly revolving fan within said casing, with the result that the cotton locks mixed with said hulls will be fluffed or opened out so as to enable them to be more readily engaged by the teeth of the saw cylinders 16 and 17. The hulls passing through the conduit 19, and practically free from cotton, are discharged through the outlet end of the conduit 19 into the pipe 28, whence they are led to the dump. The hulls passing through the recleaning system are discharged from the duct 46 and join the hulls passing through the conduit 19.

In the operation of the above described machine, practically all of the cotton escaping from the cleaning machines and which would otherwise be lost, is reclaimed and thereafter recleaned.

While we have shown the discharge pipe 14 as taking the cotton from the recleaning machine back to the feed pipe 5, we believe we have made it clear that the recleaned cotton may not take this course, but can be discharged at another point, and either subsequently, by suction, passed through the main battery of cleaners, or in any other way, separately cleaned.

We claim:

1. In apparatus of the class described, in combination with a cotton cleaning machine, a cotton reclaiming machine having a continuous passage therethrough, pneumatic means for withdrawing hulls and escaped cotton particles from the discharge of the cotton cleaning machine and continuously propelling them through the passage of said reclaiming machine, a rotatable saw cylinder mounted in said reclaiming machine and projecting through a wall of said passage into the path of the propelled hulls and cotton the saws arresting the movement of cotton while permitting the separation and free passage of hulls past said saws, and means outside of said passage for recovering cotton withdrawn by said saw cylinder.

2. In apparatus of the class described, in combination with a cotton cleaning machine, a cotton reclaiming machine having a continuous passage therethrough, pneumatic means for withdrawing hulls and escaped cotton particles from the discharge of the cotton cleaning machine and continuously propelling them through the passage of said reclaiming machine, a rotatable saw cylinder mounted in said reclaiming machine and projecting through a wall of said passage into the path of the propelled hulls and cotton the saws arresting the movement of cotton while permitting the separation and free passage of hulls past said saws, means for recovering cotton withdrawn by said saw cylinder, and means outside of said passage for recleaning said cotton co-operating directly with said cotton recovering means.

3. In apparatus of the class described, in combination with a cotton cleaning machine, a cotton reclaiming machine having a continuous passage therethrough, pneumatic means for withdrawing hulls and escaped cotton particles from the discharge of the cotton cleaning machine and propelling them through the passage of said reclaiming machine, a rotatable saw cylinder mounted in said reclaiming machine and projecting through a wall of said passage into the path of the propelled hulls and cotton the saws arresting the movement of cotton while permitting the separation and free passage of hulls past said saws, and a doffer cylinder located outside of said passage for removing the cotton withdrawn by said saw cylinder.

4. In apparatus of the class described, in combination with a cotton cleaning machine, a cotton reclaiming machine having a continuous passage therethrough, pneumatic means for withdrawing hulls and escaped cotton particles from the discharge of the cotton cleaning machine and propelling them through the passage of said reclaiming machine, a rotatable saw cylinder mounted in said reclaiming machine and projecting through a wall of said passage into the path of the propelled hulls and cotton the saws arresting the movement of cotton while permitting the separation and free passage of hulls past said saws, means for rotating said saw cylinder in a direction opposite to that of the propelled products, and means for recovering cotton withdrawn by said saw cylinder.

5. In apparatus of the class described, in combination with a cotton cleaning machine, a cotton reclaiming machine having a continuous passage therethrough, means for withdrawing hulls and escaped cotton particles from the discharge of the cotton cleaning machine and propelling them through the passage of said reclaiming machine, a rotatable saw cylinder mounted in said reclaiming machine and projecting through a wall of said passage into the path of the propelled hulls and cotton the saws arresting the movement of cotton while permitting the separation and free passage of hulls past said saws, a doffer cylinder having longitudinal blades thereon adapted to be rotated by the cylinder in proximity to the surface of said saw cylinder and acting to remove cotton therefrom and also to propel said cotton, and a pipe for receiving the cotton propelled by said doffer cylinder and conveying it back to the cotton cleaning machine.

6. In apparatus of the class described, in combination with a cotton cleaning machine, a cotton reclaiming machine having a continuous passage therethrough, means for withdrawing the hulls and escaped cotton particles from the discharge of the cotton cleaning machine and propelling them through the passage of said reclaiming machine, a rotatable saw cylinder mounted in said reclaiming machine and projecting through one wall of said passage into the path of the propelled hulls and cotton, the opposite wall of the passage being shaped to provide a portion extending substantially tangentially to the saw cylinder to act as a deflector, and beyond said tangential portion, being substantially concentric to the surface of the saw cylinder the saws arresting the movement of cotton while permitting the separation and free passage of hulls past said saws, and means for recovering cotton withdrawn from said passage by the saw cylinder.

7. In apparatus of the class described, in combination with a cotton cleaning machine, a cotton reclaiming machine having a continuous passage therethrough, means for withdrawing hulls and escaped cotton particles from the discharge of the cotton cleaning machine and propelling them through the passage of said reclaiming machine, a plurality of rotatable saw cylinders mounted at a distance from each other in said reclaiming machine and projecting through one wall of said passage into the path of the propelled hulls and cotton, the opposite wall of the passage being shaped to provide sections extending substantially tangentially to the surface of the respective saw cylinders, and beyond said tangential portions, being substantially concentric with the surface of the respective saw cylinders the saws arresting the movement of cotton while permitting the separation and free passage of hulls past said saws, and means for recovering cotton withdrawn by said saw cylinders from said passage.

8. In apparatus of the class described, in combination with a cotton cleaning machine, a cotton reclaiming machine having a continuous passage therethrough, pneumatic means for withdrawing hulls and escaped cotton particles from the discharge of the cotton cleaning machine and propelling them through the passage of said reclaiming machine, a saw cylinder mounted in said reclaiming machine and projecting through one wall of said passage into the path of the propelled hulls and cotton, means for rotating said saw cylinder in a direction opposite to that of the propelled products, deflecting means in said passage for directing the propelled products against the surface of the saw cylinder, the saws arresting the movement of cotton while permitting the separation and free passage of hulls past said saws and means for recovering cotton withdrawn by said saw cylinder from said passage.

9. In apparatus of the class described, in combination with a cotton cleaning machine, a cotton reclaiming machine having a continuous passage therethrough, pneumatic means for withdrawing hulls and escaped cotton particles from the discharge of the cotton cleaning machine and propelling them through the passage of said reclaiming machine, a rotatable saw cylinder mounted in said reclaiming machine and projecting through one wall of said passage into the path of the propelled hulls and cotton, the extent of such projection being not more than one-half the periphery of the cylinder, the saws arresting the movement of cotton while permitting the separation and free passage of hulls past said saws and means for recovering cotton withdrawn from said passage by said saw cylinder.

10. In apparatus of the class described, in combination with a cotton cleaning machine, a cotton reclaiming machine having a continuous passage therethrough, pneumatic means for withdrawing the hulls and escaped cotton particles from the discharge of the cotton cleaning machine and propelling them through the passage of said reclaiming machine, a plurality of saw cylinders mounted in said reclaiming machine and projecting through a wall of said passage into the path of the propelled hulls and cotton, the opposite wall of the passage being shaped to cause the hulls and cotton to be projected onto the surfaces of the saw cylinders in succession and to provide a free passage beyond each saw cylinder the saws arresting the movement of cotton while permitting the separation and free passage of hulls past said saws, and a doffer co-operating with the saw cylinders for removing cotton therefrom.

11. In apparatus of the class described, in combination with a cotton cleaning machine, a cotton reclaiming machine having a continuous passage therethrough, a fan casing having a fan therein, a pipe connecting the discharge of said fan casing with the entrance to said passage, a conduit leading from the discharge of said cotton cleaning machine to the suction side of said fan casing, whereby cotton and hulls will be withdrawn from the cotton cleaning machine by said fan, engaged by the blades thereof, and propelled thereby and by the blast of air through said pipe into and through said continuous passage, a rotatable saw cylinder mounted in said reclaiming machine and projecting through a wall of said passage into the path of the propelled hulls and cotton, the saws arresting the movement of cotton while permitting the separation and free passage of hulls past said saws, and means for recovering cotton withdrawn by said saw cylinder.

12. In apparatus of the class described, in combination with a cotton cleaning machine, a cotton reclaiming machine having a continuous passage therethrough, means for withdrawing the hulls and escaped cotton particles from the discharge of the cotton cleaning machine and propelling them through the passage of said reclaiming machine, a plurality of saw cylinders mounted in said reclaiming machine and projecting through a wall of said passage into the path of the propelled hulls and cotton, the opposite wall of the passage being shaped to provide, in order, sections tangential to and concentric with the respective cylinders, whereby the propelled product will be forced to engage the surface of each saw cylinder in succession so that the cotton particles will be engaged by the saws and the hulls may freely bounce from and pass beyond said saw cylinders in the spaces provided by the concentric portions of said wall, and means for recovering the cotton withdrawn from said passage by said saw cylinders.

13. In apparatus of the class described, in combination with a cotton cleaning machine, a cotton reclaiming machine having a continuous passage therethrough, means for withdrawing hulls and escaped cotton particles from the discharge of the cotton cleaning machine and propelling them through the passage of said reclaiming machine, a rotatable saw cylinder mounted in said reclaiming machine and projecting through a wall of said passage into the path of the propelled hulls and cotton, the saws arresting the movement of cotton while permitting the separation and free passage of hulls past said saws, said passage being outwardly flared from the point of inlet thereto of the mixed hulls and cotton to a width substantially that of said saw cylinder, and means for recovering cotton withdrawn by said saw cylinder.

14. In apparatus of the class described, in combination with a cotton cleaning machine, a cotton reclaiming machine having a continuous passage therethrough, means for withdrawing hulls and escaped cotton particles from the discharge of the cotton cleaning machine and propelling them through the passage of said reclaiming machine, a rotatable saw cylinder mounted in said reclaiming machine and projecting through a wall of said passage into the path of the propelled hulls and cotton, a doffer cylinder for removing the cotton withdrawn by said saw cylinder, recleaning mechanism for receiving the cotton from said doffer cylinder, and means for passing hulls from said recleaning mechanism into the outlet portion of said continuous passage.

15. In apparatus of the class described, in combination with a cotton cleaning machine, a cotton reclaiming machine having a continuous passage therethrough, means for withdrawing hulls and escaped cotton particles from the discharge of the cotton cleaning machine and propelling them through the passage of said reclaiming machine, a rotatable saw cylinder mounted in said reclaiming machine and projecting through a wall of said passage into the path of the propelled hulls and cotton, a doffer cylinder rotating in proximity to said saw cylinder outside of said passage, and recleaning mechanism positioned to receive the cotton thrown off by said doffer and including a saw cylinder rotating in proximity to said doffer cylinder and adapted to have the cotton doffed therefrom by said doffer cylinder and discharged out of the machine.

16. In apparatus of the class described, in combination with a cotton cleaning machine, a cotton reclaiming machine having a continuous passage therethrough, means for withdrawing hulls and escaped cotton particles from the discharge of the cotton cleaning machine and propelling them through the passage of said reclaiming machine, a pair of rotatable saw cylinders mounted at a distance from each other in said reclaiming machine and projecting through a wall of said passage into the path of the propelled hulls and cotton, a doffer cylinder rotating in proximity to said saw cylinders below said passage and adapted to doff the cotton therefrom, and recleaning mechanism positioned to receive cotton thrown off by said doffer cylinder and including a saw cylinder located in proximity to said doffer cylinder and adapted to have cotton doffed therefrom by said doffer cylinder and discharged out of the machine.

17. In apparatus of the class described, in combination with a cotton cleaning machine, a cotton reclaiming machine having a continuous passage therethrough, means for withdrawing hulls and escaped cotton particles from the discharge of the cotton cleaning machine and propelling them through the passage of said reclaiming machine, a rotatable saw cylinder mounted in said reclaiming machine and projecting through a wall of said passage into the path of the propelled hulls and cotton, a doffer cylinder for removing the cotton withdrawn by said saw cylinder, recleaning mechanism positioned to receive the cotton thrown off by said doffer cylinder, a receptacle for receiving hull particles passing out of said recleaning mechanism, a duct leading out of said receptacle to the outlet end of said continuous passage, a door yieldingly closing the outlet of said duct, and means for continuously forcing the hulls from said receptacle through said duct, whereby, by pressure of the hulls, to open said door to permit the escape of hulls while constantly maintaining a supply of hulls in the duct to prevent ingress of air thereto.

18. A cotton recleaning machine comprising a casing affording a continuous passage through which mixed cotton and hulls may be pneumatically propelled, a saw cylinder projecting through one wall of said passage into the path of the propelled hulls and cotton, the saws arresting the movement of cotton while permitting the separation and free passage of hulls past said saws and a doffer co-operating with said saw cylinder outside of said passage.

19. A cotton recleaning machine comprising a casing affording a continuous passage through which mixed cotton and hulls may be pneumatically propelled, a plurality of saw cylinders projecting through one wall of said passage into the path of the propelled hulls and cotton, cotton cleaning mechanism including a saw cylinder, and a doffer rotating in proximity to the peripheries of all of the saw cylinders and operating to doff cotton from the first named saw cylinders and discharge it into the cleaning mechanism, and to doff the cotton from the saw cylinder of the latter mechanism and discharge it from the machine.

20. A cotton recleaning machine comprising a casing affording a continuous passage through which mixed cotton and hulls may be propelled, a pair of saw cylinders projecting in spaced relation through one wall of said passage into the path of the propelled hulls and cotton, cotton recleaning mechanism including a saw cylinder, a doffer cylinder rotating in proximity to the surfaces of the three saw cylinders and operating to doff cotton from the first two saw cylinders and discharge it into the cleaning mechanism, and then to doff the cotton from the saw cylinder of the latter and discharge it from the machine, and means for receiving hulls passing from said cleaning mechanism and controllably discharging them into the outlet end of said continuous passage.

21. A cotton recleaning machine comprising a casing affording a continuous passage through which mixed cotton and hulls may be pneumatically propelled, a saw cylinder projecting through one wall of said passage to an extent not greater than one-half of the periphery of the cylinder the saws arresting the movement of cotton while permitting the separation and free passage of hulls past said saws, and a doffer co-operating with said saw cylinder outside of said passage.

22. A cotton reclaiming machine having a continuous passage therethrough, pneumatic means for propelling mixed cotton and hulls through said passage, a rotatable saw cylinder mounted in said reclaiming machine and projecting through a wall of said passage into the path of the propelled hulls and cotton, said saws arresting the movement of cotton while permitting the separation and free passage of hulls past said saws, the opposite wall of the passage being shaped to direct the propelled hulls and cotton onto the surface of said saw cylinder, and a doffer co-operating with said saw cylinder to remove therefrom cotton engaged by the teeth of the cylinder.

23. A cotton reclaiming machine having a continuous passage therethrough, pneumatic means for propelling mixed cotton and hulls through said passage, a rotatable saw cylinder mounted in said reclaiming machine and projecting through a wall of said passage into the path of the propelled hulls and cotton, said saws arresting the movement of cotton while permitting the separation and free passage of hulls past said saws, deflecting means in said passage for directing the propelled products against the surface of the saw cylinder, and means for recovering cotton withdrawn from said passage by said saw cylinder.

In testimony whereof, we have hereunto set our hands.

JOHN E. MITCHELL.
DENNIS PARKS.